(12) United States Patent
Hirasawa

(10) Patent No.: US 11,240,476 B2
(45) Date of Patent: Feb. 1, 2022

(54) IMAGE PROJECTION DEVICE AND INFORMATION PROCESSING METHOD

(71) Applicant: SONY CORPORATION, Tokyo (JP)

(72) Inventor: Takeaki Hirasawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 363 days.

(21) Appl. No.: 16/329,298

(22) PCT Filed: Aug. 21, 2017

(86) PCT No.: PCT/JP2017/029803
§ 371 (c)(1),
(2) Date: Feb. 28, 2019

(87) PCT Pub. No.: WO2018/079023
PCT Pub. Date: May 3, 2018

(65) Prior Publication Data
US 2019/0253680 A1 Aug. 15, 2019

(30) Foreign Application Priority Data

Oct. 31, 2016 (JP) .............................. JP2016-213088

(51) Int. Cl.
*H04N 9/31* (2006.01)
*G03B 21/14* (2006.01)
(Continued)

(52) U.S. Cl.
CPC .......... *H04N 9/3194* (2013.01); *G03B 21/14* (2013.01); *G05B 23/02* (2013.01); *G05B 23/0283* (2013.01); *H04N 5/74* (2013.01)

(58) Field of Classification Search
CPC ...... H04N 9/3194; H04N 5/74; H04N 9/3144; G05B 23/02; G05B 23/0283; G03B 21/14; G03B 21/16
See application file for complete search history.

(56) References Cited

U.S. PATENT DOCUMENTS

2010/0329704 A1 12/2010 Tachibana
2011/0279788 A1* 11/2011 Nakajima .............. G03B 21/16
353/61

(Continued)

FOREIGN PATENT DOCUMENTS

CN 102243418 A 11/2011
JP 2003-43577 A 2/2003
(Continued)

OTHER PUBLICATIONS

Hayashi et al. JP 2015-059954 (Year: 2015).*
International Search Report dated Nov. 21, 2017 in PCT/JP2017/029803 filed on Aug. 21, 2017.

*Primary Examiner* — Mohammad K Islam
(74) *Attorney, Agent, or Firm* — Oblon, McClelland, Maier & Neustadt, L.L.P.

(57) ABSTRACT

An image projection device including: an analysis unit configured to compute a functional state of one or more devices included in the image projection device based on sensor information acquired from one or more sensors; a determination unit to determine whether or not maintenance of the devices is necessary based on the functional state of the devices; and a notification control unit to present guidance information that prompts for implementation of maintenance of the devices to a user through a notification unit at a timing when it is determined by the determination unit that maintenance is necessary.

11 Claims, 7 Drawing Sheets

(51) Int. Cl.
*H04N 5/74* (2006.01)
*G05B 23/02* (2006.01)

(56) References Cited

U.S. PATENT DOCUMENTS

| | | | |
|---|---|---|---|
| 2012/0133869 A1* | 5/2012 | Liao | G02F 1/134309 349/106 |
| 2012/0154694 A1 | 6/2012 | Nishihata et al. | |
| 2016/0050400 A1* | 2/2016 | Terasaki | G03B 21/2013 353/20 |

FOREIGN PATENT DOCUMENTS

| | | |
|---|---|---|
| JP | 2009-122207 A | 6/2009 |
| JP | 2010-276737 | 12/2010 |
| JP | 2011-8142 A | 1/2011 |
| JP | 2011-242420 A | 12/2011 |
| JP | 2013-80149 A | 5/2013 |
| JP | 2015-59954 A | 3/2015 |
| WO | WO 2012/025989 A1 | 3/2012 |
| WO | WO 2014/196124 A1 | 12/2014 |

\* cited by examiner

IMAGE PROJECTION DEVICE AND INFORMATION PROCESSING METHOD

TECHNICAL FIELD

The present disclosure relates to an image projection device and an information processing method.

BACKGROUND ART

In a projector which is an image projection device that projects and displays an image on a screen or the like, a failure of equipment and degradation of optical components are more likely to occur in accordance with the usage time and usage environment. Thus, the projector conventionally includes a function of outputting a notification that prompts a user for maintenance every time a predetermined time elapses. In addition, in Patent Literature 1, for example, a measure of turning off the power of a projector 1 in accordance with the state of the projector 1 is taken such that devices included in the projector 1 do not suffer great damage as a result that maintenance is not implemented.

For example, in order to prevent dust intrusion into the projector, the projector is provided with a filter at an air inlet. However, as the usage time of the projector increases, dust adhering to the filter increases. Accordingly, the pressure loss increases, and taking-in of cooling air into the projector is inhibited. In the case where such a state progresses further, the inside of the projector can no longer be cooled sufficiently, and damages to various devices arranged within the projector, in particular, optical devices, are likely to occur to shorten the life. Therefore, the conventional projector projects and displays a message such as "Replace the filter", for example, on a projection plane to prompt a user for maintenance of the filter.

CITATION LIST

Patent Literature

Patent Literature 1: JP 2003-43577A

DISCLOSURE OF INVENTION

Technical Problem

However, merely by notifying a message as described above, the user does not notice a specific loss to be caused by not performing maintenance of the filter, and thus, filter replacement cannot be motivated sufficiently.

In addition, in the case of making a notification that prompts the user to implement maintenance of the filter or the like, the notification has conventionally been made uniformly only on the basis of the usage time without depending on the usage environment of the projector. However, the timing when maintenance of the projector is actually required is different depending on the usage environment of the user or the use mode of the projector. Thus, situations where implementation of maintenance is prompted in a projector for which maintenance is not yet necessary, and where it cannot be prompted to implement maintenance although maintenance of the projector has become necessary at an earlier timing occur.

Therefore, the present disclosure proposes an image projection device and an information processing method that are novel and improved and can prompt to implement maintenance at an appropriate timing.

Solution to Problem

According to the present disclosure, there is provided an image projection device including: an analysis unit configured to compute a functional state of one or more devices included in the image projection device on the basis of sensor information acquired from one or more sensors; a determination unit configured to determine whether or not maintenance of the devices is necessary on the basis of the functional state of the devices; and a notification control unit configured to present guidance information that prompts for implementation of maintenance of the devices to a user through a notification unit at a timing when it is determined by the determination unit that maintenance is necessary.

In addition, according to the present disclosure, there is provided an information processing method including: computing, using a processor, a functional state of one or more devices included in an image projection device on the basis of sensor information acquired from one or more sensors; determining, using the processor, whether or not maintenance of the devices is necessary on the basis of the functional state of the devices; and presenting, using the processor, guidance information that prompts for implementation of maintenance of the devices to a user through a notification unit at a timing when it is determined that maintenance is necessary.

Advantageous Effects of Invention

According to the present disclosure as described above, it is possible to prompt to implement maintenance at an appropriate timing. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
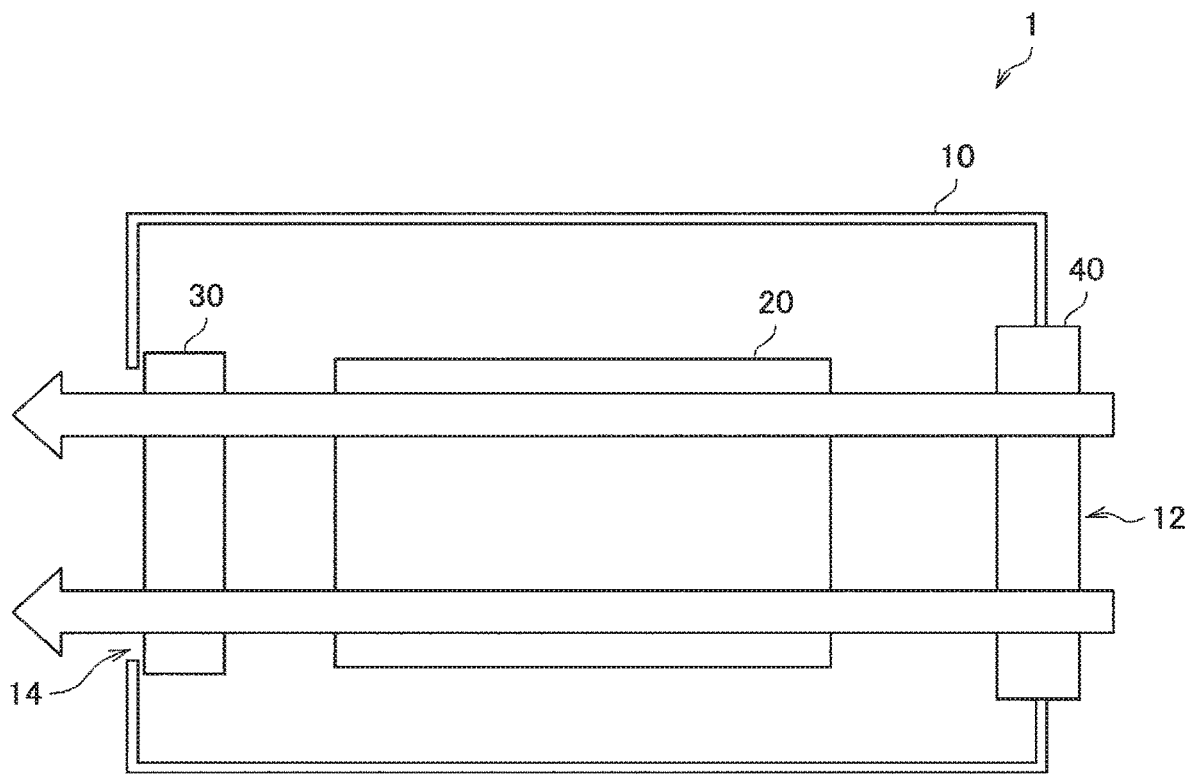
FIG. 1 is a schematic view showing a projector according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. Overview
2. Maintenance implementation notification processing
2.1. Functional configuration
2.2. Exemplary processing

1. Overview

Figure 2:
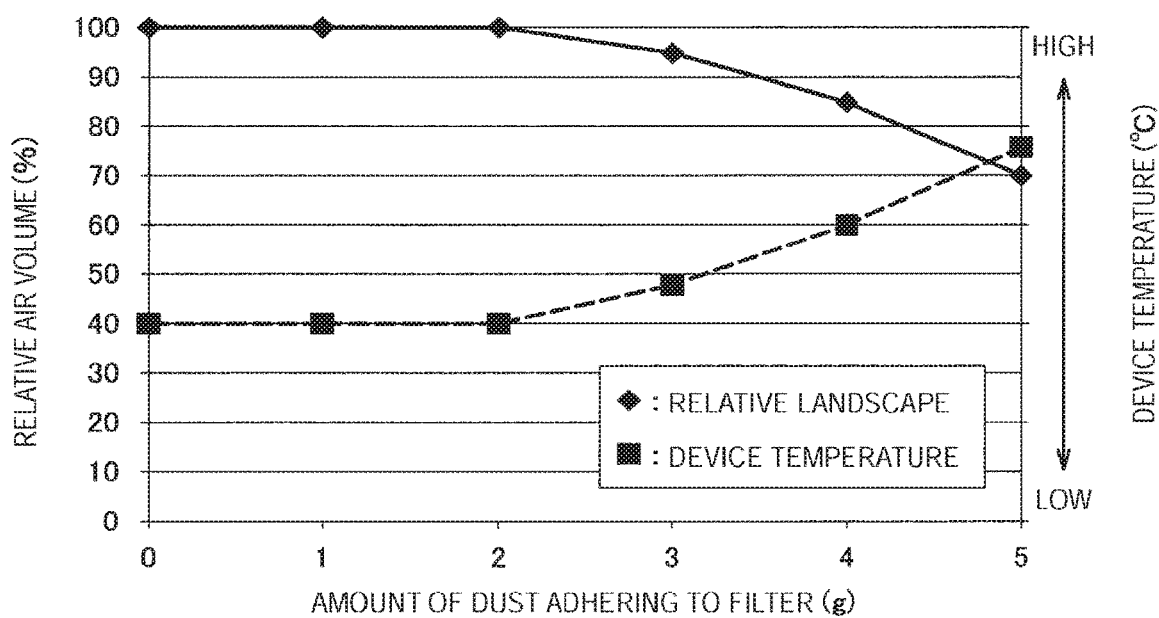
FIG. 2 is an explanatory diagram showing an exemplary relation between the amount of dust adhering to a filter and the cooling air volume and device temperature.
Figure 3:
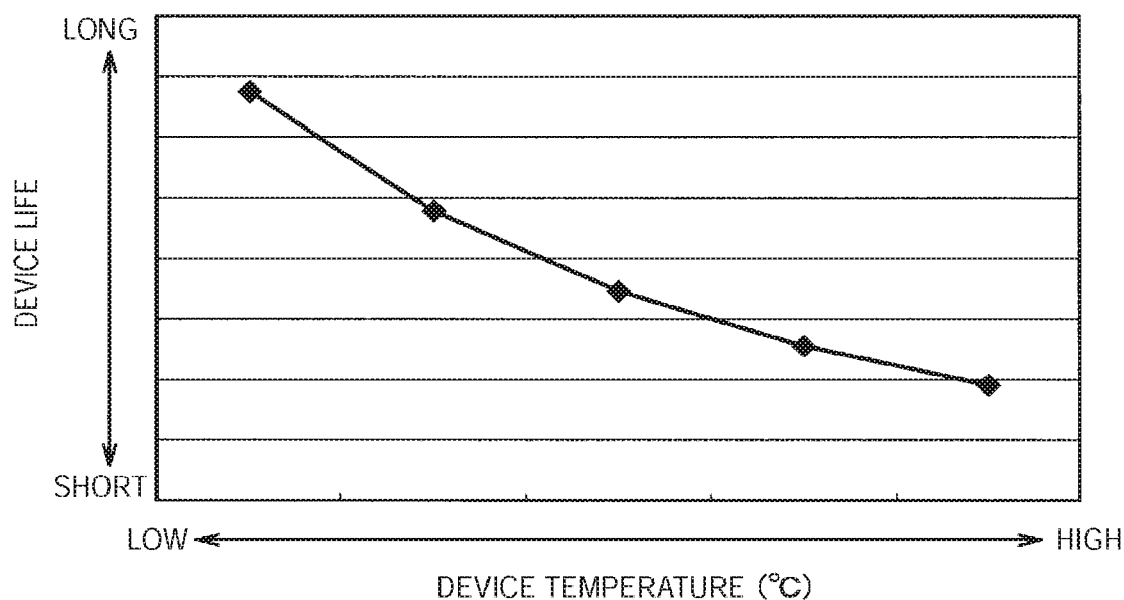
FIG. 3 is an explanatory diagram showing an exemplary relation between the device temperature and device life.
Figure 4:
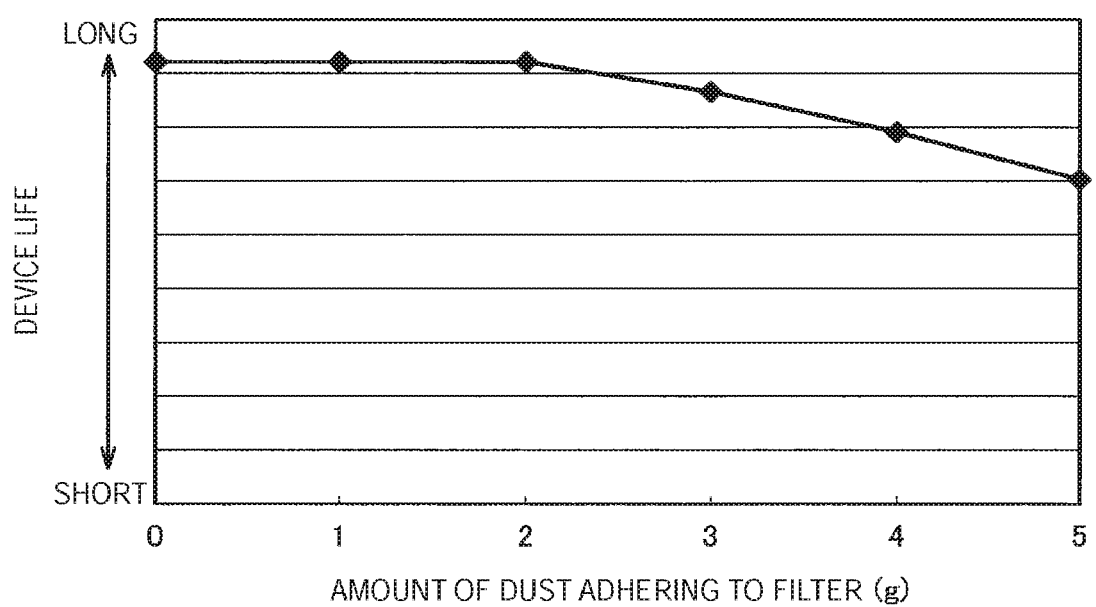
FIG. 4 is an explanatory diagram showing an exemplary relation between the amount of dust adhering to the filter and device life.

First, a schematic configuration of a projector which is an image projection device according to an embodiment of the present disclosure and an overview of a maintenance notification function in the projector will be described with reference to FIG. 1 to FIG. 4. FIG. 1 is a schematic view showing a schematic configuration of a projector 1 according to the present embodiment. FIG. 2 is an explanatory diagram showing an exemplary relation between the amount of dust adhering to a filter and the cooling air volume and device temperature. FIG. 3 is an explanatory diagram showing an exemplary relation between the device temperature and device life. FIG. 4 is an explanatory diagram showing an exemplary relation between the amount of dust adhering to the filter and device life.

The projector 1 is an example of an image projection device that projects and displays an image on a screen or the like, for example. The display system of the projector 1 according to the present embodiment is not particularly limited, but projectors of various systems, such as the 3 liquid crystal display (LCD) system, DLP system, and liquid crystal on silicon (LCOS) system, are assumed, for example. For example, in the projector of the 3LCD system, an image to be projected on a display surface of the screen or the like is generated by separating white light output from a light source device which is a light source part into three primary colors of red, green, and blue for transmission through three LCDs, respectively. The projector of the 3LCD system includes an optical modulation synthesis system component that modulates and synthesizes incident light, such as a liquid crystal panel or a dichroic prism, an illumination optical system component that guides light from a light source device to a liquid crystal panel, such as a reflective dichroic mirror or a reflective mirror, a projection optical system component that projects an image output from a dichroic prism, and the like, for example. In FIG. 1, various devices constituting the projector 1, including a power supply substrate, a signal processing substrate, a light source, an optical condensing system, and the like, are shown as a component 20.

The projector 1 has the component 20 arranged within an enclosure 10, as shown in FIG. 1. An image generated by the component 20 is output from the enclosure 10 to a projection plane through a lens. The projector 1 is provided with a cooling fan 30 that exhausts air within the enclosure 10 via an exhaust port 14 in order to suppress temperature increase within the enclosure 10 due to heat generation of the light source, a power source, or the like, and to prevent a failure of equipment and degradation of optical components. When the cooling fan 30 operates, outside air is taken in into the enclosure 10 via an air inlet 12. On this occasion, in order to prevent dust intrusion into the enclosure 10, a filter 40 is provided at the air inlet 12 of the enclosure 10. Note that FIG. 1 is a schematic view, and a fan may be installed at another opening (not shown) of the enclosure 10 besides the filter 40 shown in FIG. 1 to assist in exhausting air within the enclosure 10.

The projector 1 according to the present embodiment has the function of outputting a notification that prompts a user to implement maintenance at an appropriate timing in accordance with a functional state of each of various devices included in the projector 1. That is, performance of the projector 1 or information that exerts an influence upon performance is acquired using a sensor, and whether or not maintenance of each of the devices is necessary is determined while checking the functional state of an actual device on the basis of acquired sensor information. Then, the projector 1 makes a notification that prompts for implementation of maintenance at a timing when it is determined that maintenance is necessary.

For example, the functional state of an optical device such as a liquid crystal panel among devices provided within the projector 1 influences the cooling state within the enclosure 10. Cooling within the enclosure 10 is performed by taking in outside air via the air inlet 12 of the enclosure 10 as cooling air, and causing the taken-in cooling air to pass through the enclosure 10 to be exhausted via the exhaust port 14. The filter 40 is provided at the air inlet 12 in order to prevent dust intrusion into the enclosure 10. When the amount of dust adhering to the filter 40 increases to cause clogging, the amount of outside air taken in into the enclosure 10 decreases, so that the inside of the enclosure 10 is no longer cooled sufficiently. Then, the optical device or the like is raised in temperature, and the life is shortened.

Hereinafter, specific description will be given. First, in FIG. 2, the relation between the amount of dust adhering to the filter 40 and the cooling air volume and device temperature will be considered. Here, in FIG. 2, the cooling air volume is indicated as a relative air volume supplied into the enclosure 10. The relative air volume indicates a relative air volume in the case where the air volume of the filter 40 in the initial state is assumed as 100%. In addition, the amount of dust adhering to the filter 40 indicates the amount of dust adhesion per unit area. As shown in FIG. 2, as dust adheres to the filter 40, the pressure loss of the filter 40 increases. At this time, it is adaptable without degrading cooling performance within the enclosure 10 by increasing the driving ability of the cooling fan 30 until the allowable range of the driving ability of the cooling fan 30 is exceeded.

However, in the case where a pressure loss exceeding the driving ability of the cooling fan 30 occurs, the air volume of outside air taken in into the enclosure 10 is reduced. Note that the degree of reduction of the air volume of outside air taken in into the enclosure 10 depends on the feature of dust deposited on the filter 40, the ability of the cooling fan 30, the filter area of the filter 40, and the like. When the air volume of outside air taken in into the enclosure 10 is reduced in this manner, the cooling ability of a device provided within the enclosure 10 is degraded, and the device is raised in temperature.

Next, in FIG. 3, the relation between the device temperature of a device provided within the enclosure 10 and the device life of the device will be considered. In general, performance deterioration proceeds as an optical member (in particular, an optical member in which an organic material is used) is used at a higher temperature, and the life becomes shorter. The same applies to an optical device of the projector 1, and as shown in FIG. 3, the device life becomes shorter as the device temperature becomes higher. Note that, as the device life, a time when the cumulative failure rate of the device exceeds 50%, for example, may be defined as the life.

Then, from FIG. 2 and FIG. 3, relevance between the amount of dust adhering to the filter 40 and device life as shown in FIG. 4 is obtained. It is understood from FIG. 4 that, as the projector 1 is used in the state where the amount of dust adhering to the filter 40 is greater, the life of an optical device becomes shorter. In addition, in the case where the optical device is damaged to be shortened in life, the damage is generally irreversible. Thus, even if the filter 40 is replaced, the damage to the optical device will not be recovered after replacement of the filter 40 to restore the life. Consequently, whether the user can be prompted to cause maintenance to be executed reliably at a stage before the device is damaged is important for using the projector 1 stably for a long period.

Therefore, the projector 1 according to the present embodiment has the function of prompting the user to perform maintenance of the projector 1 reliably at an optimum timing for the projector 1. Accordingly, the device life of each of the devices included in the projector 1 will not become shorter than the life assumed at the time of designing, and the performance of the projector 1 will not be degraded significantly. Hereinafter, processing of making a notification that prompts for implementation of maintenance of the projector 1 according to the present embodiment will be described.

2. Maintenance Implementation Notification Processing

2.1. Functional Configuration

Figure 5:
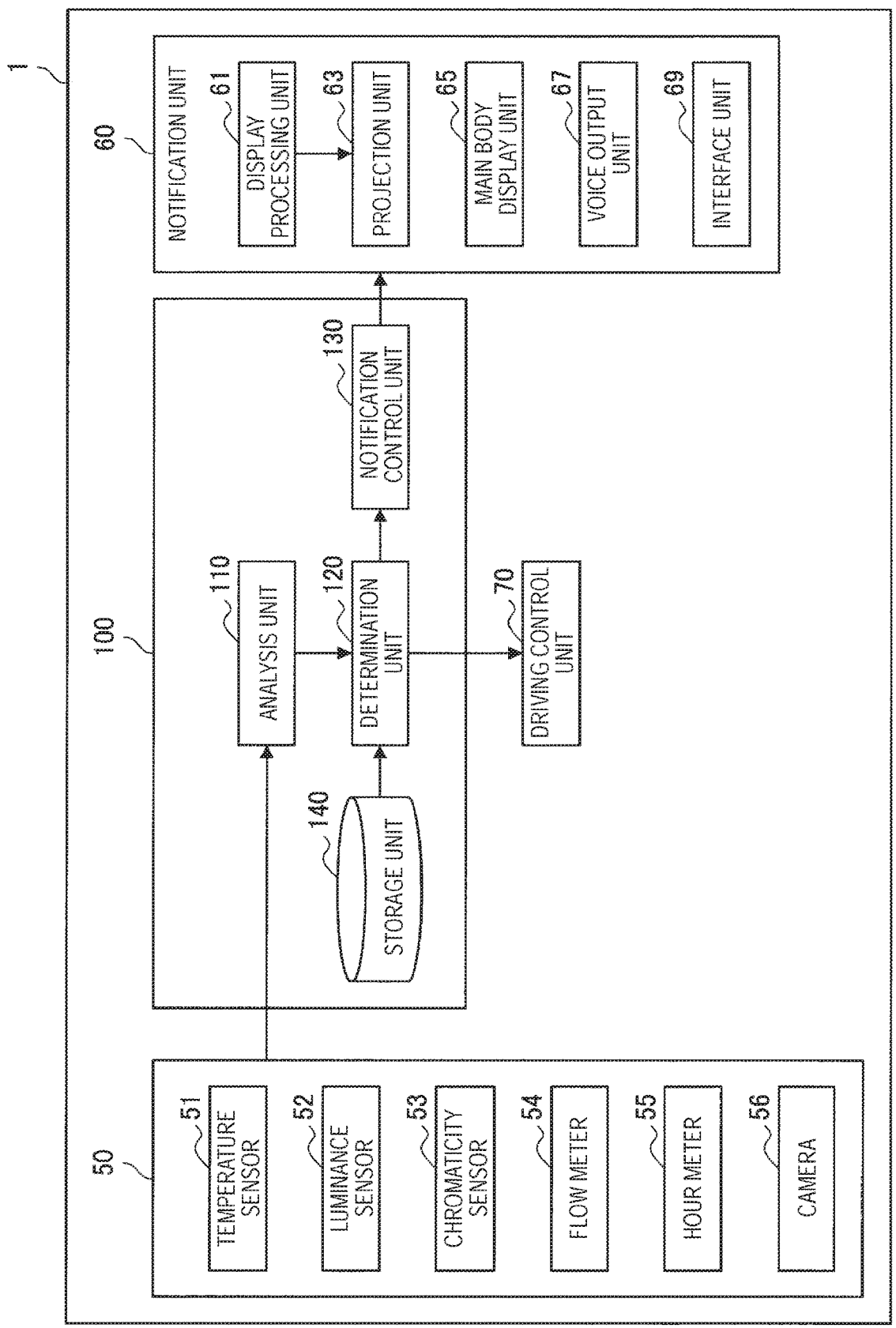
FIG. 5 is a functional block diagram showing a functional configuration of an information processing device according to the embodiment.

First, in the projector 1 according to the present embodiment, a functional configuration of an information processing device 100 that executes processing of making a notification that prompts for implementation of maintenance of the projector 1 will be described on the basis of FIG. 5. FIG. 5 is a functional block diagram showing a functional configuration of the information processing device 100 according to the present embodiment. The information processing device 100 is illustrated as being provided in the main body of the projector 1 in FIG. 5, but may be provided separately from the projector 1.

The information processing device 100 according to the present embodiment includes an analysis unit 110, a determination unit 120, a notification control unit 130, and a storage unit 140 as shown in FIG. 5.

The analysis unit 110 analyzes a functional state of a device on the basis of performance of the projector 1 or information that exerts an influence upon performance of the projector 1. The performance of the projector 1 or information that exerts an influence upon performance of the projector 1 is acquired by a sensor 50. The sensor 50 may be provided for the main body of the projector 1, or may be an external sensor connected to be capable of communicating with the information processing device 100. As the sensor 50, a temperature sensor 51, a luminance sensor 52, a chromaticity sensor 53, a flow meter 54, an hour meter 55, a camera 56, or the like may be used, for example.

The temperature sensor 51 is a sensor that is provided within the enclosure 10 of the projector 1 and measures the internal temperature of the enclosure 10. Alternatively, the temperature sensor 51 may be a sensor that measures the device temperature of a device provided within the enclosure 10. The temperature sensor 51 enables the cooling state within the enclosure 10 to be grasped. The luminance sensor 52 and the chromaticity sensor 53 are sensors that measure luminance and chromaticity of incident light projected by the projector 1. The luminance or chromaticity enable the functional state of the light source or liquid crystal panel of the projector 1 to be grasped. The flow meter 54 measures the flow rate of outside air taken in into the enclosure 10 via the air inlet 12. The flow rate measured by the flow meter 54 enables the degree of clogging of the filter 40 to be grasped. The hour meter 55 measures the cumulative usage time of the projector 1 or usage time since maintenance is implemented last time. The camera 56 images the state within the enclosure 10. In the case where the device state can be determined visually, it is sufficient if it is possible to image a targeted device using the camera 56.

Note that the projector 1 may be provided with a plurality of sensors of an identical type. In addition, the projector 1 may utilize a sensor other than those described above as the sensor 50. It is sufficient if the information processing device 100 can acquire information from at least one sensor. Information (hereinafter also referred to as "sensor information") acquired by the sensor 50 is input to the analysis unit 110 of the information processing device 100.

The analysis unit 110 analyzes the functional state of a device included in the projector 1 on the basis of sensor information acquired by the sensor 50. Here, the functional state of a device refers to the degree of device damage, and is specifically represented by the device life, failure rate, or the like. Each device is gradually reduced in function in accordance with the usage time or usage environment. The analysis unit 110 calculates the degree of reduction in function of the device, that is, the degree of damage to the device on the basis of the sensor information. The calculated functional state of each device is output to the determination unit 120.

On the basis of the functional state of each device calculated by the analysis unit 110, the determination unit 120 determines whether or not maintenance of the device is necessary. A threshold value has been set for the functional state of each device, and the determination unit 120 determines whether or not the current functional state has fallen below the threshold value for each device. When it is determined that maintenance is necessary for at least one device, the determination unit 120 instructs the notification control unit 130 to execute notification processing. In addition, the determination unit 120 determines whether or not maintenance has been implemented on the basis of sensor information acquired after guidance information is notified. The determination unit 120 causes a driving control unit 70 that controls each device of the projector 1 to change the driving mode of the projector 1 according to necessity on the basis of whether or not maintenance has been implemented.

The notification control unit 130 presents guidance information that prompts for implementation of maintenance of a device for which it has been determined that maintenance is necessary to the user at a timing when it is determined that maintenance is necessary. The notification control unit 130 instructs a notification unit 60 of the projector capable of notifying guidance information to present the guidance information.

Examples of the notification unit 60 include a display processing unit 61 and a projection unit 63 as functional units for making a display on an image projected by the projector 1. Upon receiving the instruction from the notification control unit 130, the display processing unit 61 performs processing of superimposing the guidance information that prompts for implementation of device maintenance on a projected image, and the image after the processing is projected on the projection plane through the projection unit 63. In the present embodiment, since guidance information that prompts for implementation of device maintenance can be displayed on an image projected by the projector 1, the user can be notified in an easy-to-understand manner. Alternatively, as the notification unit 60, a main body display unit 65 or a voice output unit 67 provided for the main body of the projector 1, or the like may be utilized, for example. Further, guidance information may be displayed on external equipment through an interface unit 69 that communicates with the external equipment. Examples of the external equipment include a remote controller.

The storage unit 140 stores various types of information necessary for performing maintenance implementation notification processing. Threshold values concerning the functional states of devices necessary for determining whether or not implementation of maintenance is necessary, for example, are stored in the storage unit 140. Alternatively, the manner of making a notification by the notification unit 60, a driving mode of the projector 1 set in the case where guidance information has been notified but maintenance is not executed, and the like are stored in the storage unit 140. Note that, in FIG. 5, the storage unit 140 is illustrated as being referred to only by the determination unit 120, whilst the present disclosure is not limited to such an example, but it is also possible to store information required by other functional units. In this case, the storage unit 140 can be referred to by those functional units.

2.2. Exemplary Processing

Figure 6:
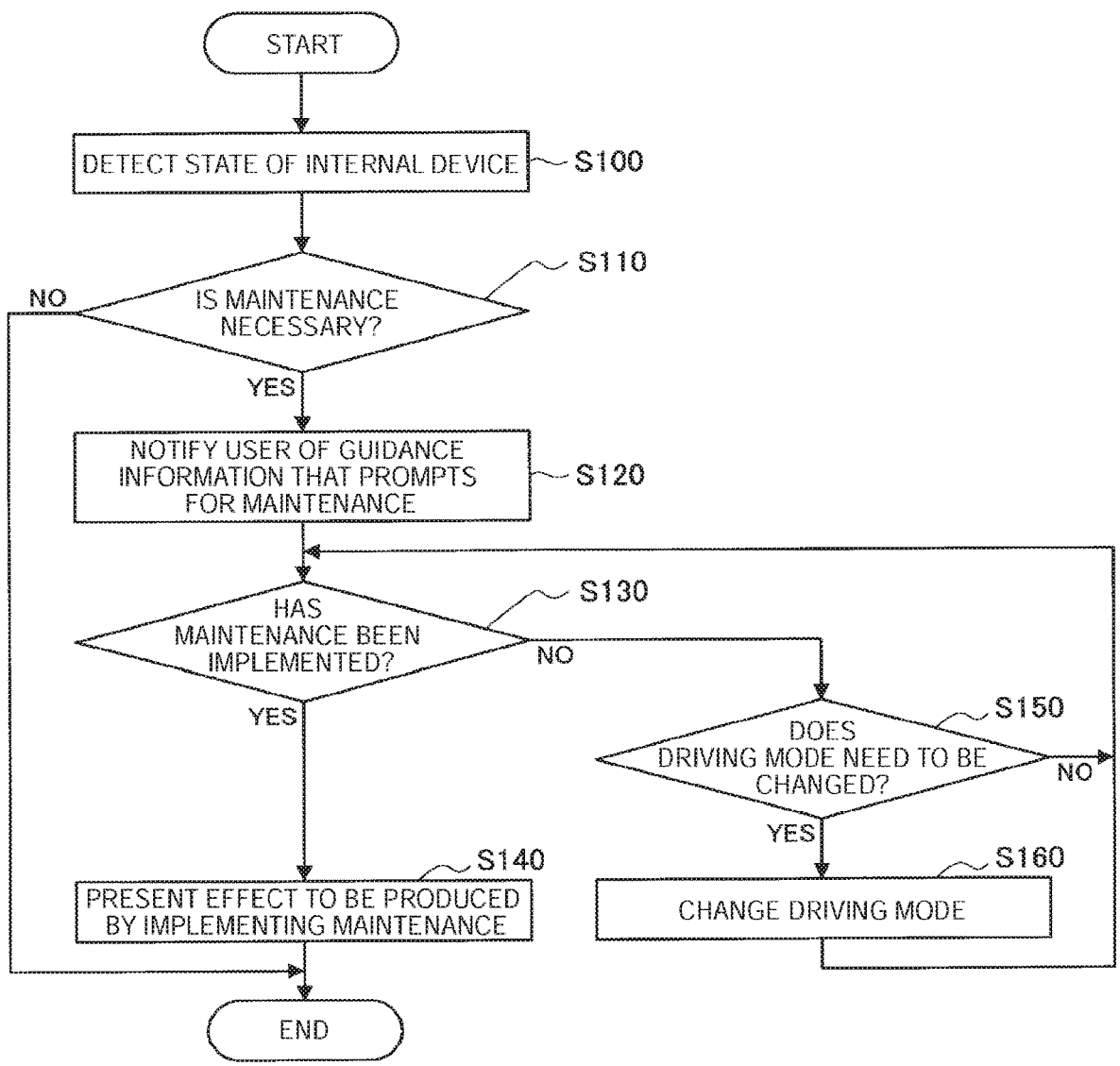
FIG. 6 is a flowchart showing an example of maintenance implementation notification processing performed by the information processing device according to the embodiment.

In the projector 1 according to the present embodiment, an example of maintenance implementation notification processing performed by the information processing device 100 will be described on the basis of FIG. 6 to FIG. 10. Note that FIG. 6 is a flowchart showing an example of maintenance implementation notification processing performed by the information processing device 100 according to the present embodiment. FIG. 7 to FIG. 10 are explanatory diagrams showing examples of guidance information and the like. In the following description, the case of determining whether or not maintenance of the filter 40 provided at the air inlet 12 of the enclosure 10 of the projector 1 is necessary will be considered as a specific example.

The information processing device 100 according to the present embodiment checks whether or not to present guidance information that prompts for implementation of maintenance at a predetermined timing at the startup of the projector 1. For example, every time a predetermined time elapses, the processing shown in FIG. 6 is performed.

Specifically, first, functional states of various devices provided within the projector 1 are analyzed by the analysis unit 110 by the analysis unit 110 (S100). The analysis unit 110 acquires sensor information from the sensor 50 in order to acquire the functional state of each device of the projector 1 at a timing when implementing the processing. For example, in order to acquire the functional state of the filter 40, sensor information includes the internal temperature of the projector 1 acquired by the temperature sensor 51, flow rate of outside air passing through the filter 40 measured by the flow meter 54, and the like. Further, the driving time of the projector 1 or the usage time of the filter 40 acquired by the hour meter 55, an image of the filter 40 captured by the camera 56, or the like may be used as sensor information.

The analysis unit 110 represents the functional state of each device by an index representing device damage, for example, the device life or failure rate or the like, using sensor information. It is assumed that the relation between the sensor information and the index representing device damage has been acquired in advance. The analysis unit 110 converts the sensor information into the index representing device damage for output to the determination unit 120 as the functional state of the current device. The analysis unit 110 acquires the functional state for each device being monitored.

Next, it is determined by the determination unit 120 whether or not device maintenance is necessary on the basis of the functional state of each device calculated by the analysis unit 110 (S110). The determination unit 120 acquires the threshold value of the functional state set for each device with reference to the storage unit 140 for comparison with the functional state of the device obtained in step S100. Then, the determination unit 120 determines whether or not maintenance of the device is necessary on the basis of the magnitude relation between the current functional state and the threshold value.

For example, assuming that a remaining device life is used as the functional state of the device, it is determined that maintenance is necessary in the case where the device life becomes shorter than or equal to a time set as a threshold value. In this case, when it is determined that the device life obtained in step S100 is longer than the threshold value, the determination unit 120 terminates the processing shown in FIG. 6, and the information processing device 100 waits for a timing when the maintenance implementation notification processing is implemented next time. On the other hand, in the case where it is determined that the device life obtained in step S100 is less than or equal to the threshold value, the determination unit 120 determines to notify the user of guidance information that prompts for implementation of maintenance, and instructs the notification control unit 130 to notify the guidance information (S120).

Figure 7:
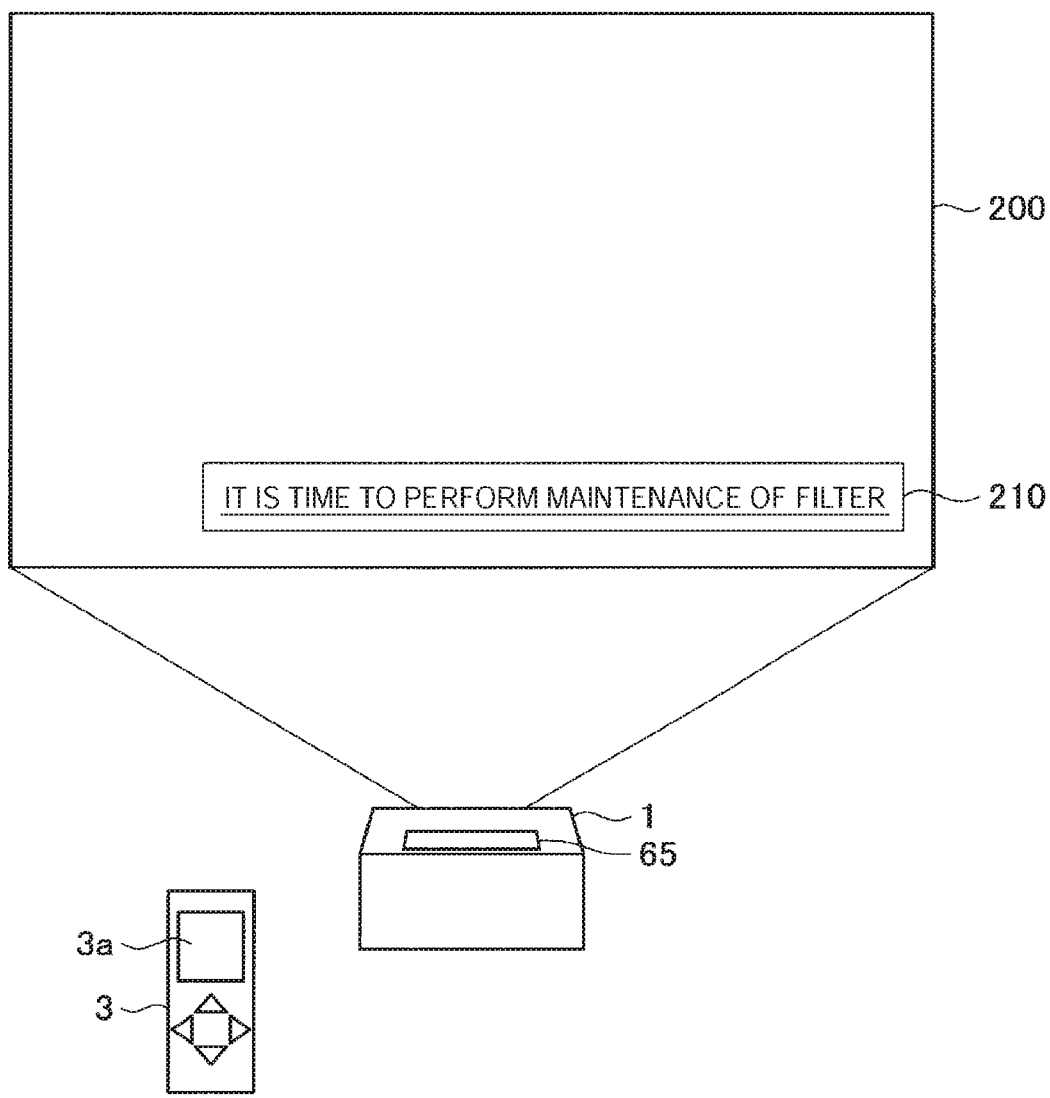
FIG. 7 is an explanatory diagram showing an example of guidance information on a screen projected on a projection plane.
Figure 8:
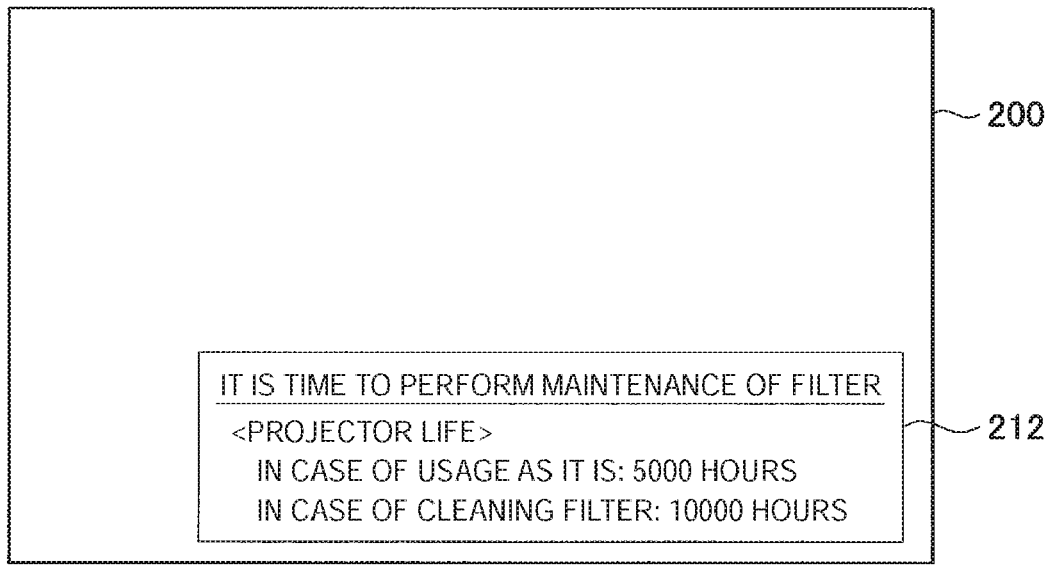
FIG. 8 is an explanatory diagram showing an example of guidance information on the screen projected on the projection plane, and showing an example of presenting the current projector life and the projector life after maintenance.
Figure 9:
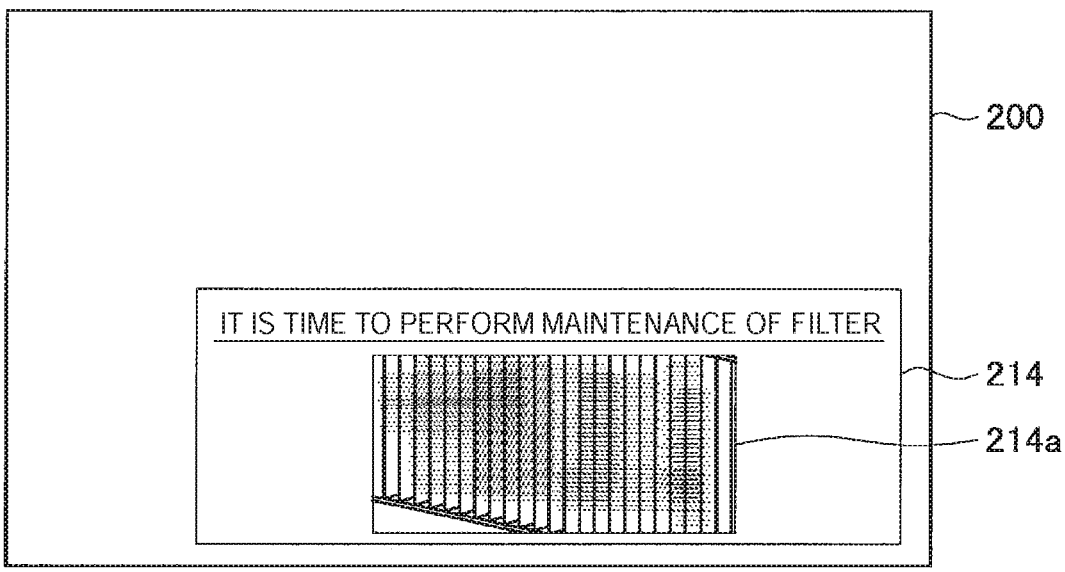
FIG. 9 is an explanatory diagram showing an example of guidance information on the screen projected on the projection plane, and showing an example of presenting together with an image obtained by imaging the inside of the projector with a camera.

The notification control unit 130 prompts the user to implement maintenance of the device by a notification method set in advance. As the manner of notifying guidance information, causing guidance information 210 to be displayed on an image 200 projected by the projector 1, or to be displayed on the main body display unit 65 of the projector 1, as shown in FIG. 7, for example, is considered. Alternatively, guidance information may be displayed on a display unit 3a of external equipment such as a remote controller 3 capable of communicating with the projector 1, or may be notified by voice through a voice output unit of the projector 1 or external equipment. Since the projector 1 is capable of notifying guidance information utilizing an image projected on the projection plane, the guidance information can be presented in a manner that easily enters the field of view of the user, so that it is possible to effectively prompt the user to implement maintenance. It is sufficient if the guidance information is notified using at least one of the notification units 60.

Here, as the guidance information, a message that prompts the user to implement maintenance of the filter, such as "It is the time to perform maintenance of the filter", may be used, as shown in FIG. 7, for example. Further, in order to further motivate the user to implement maintenance, a specific functional state of the device or the like may be presented. For example, as in guidance information 212 in FIG. 8 when prompting to perform maintenance of the filter, the life in the case where the projector is used continuously without performing maintenance and the projector life in the case where maintenance is implemented may be displayed for comparison. Accordingly, since the effect in the case where maintenance is implemented is presented to the user clearly, the user can be motivated strongly. In addition, a captured image 214*a* obtained by imaging the filter by the camera 56 installed within the projector 1 may be displayed together with a message, like guidance information 214 in FIG. 9, for example. Since degradation in function of the filter can be noticed visually by presenting the actual filter state to the user, it is possible to motivate the user strongly.

In addition, for example, the manner in which the internal temperature of the projector 1 is raised, and the lives of optical components within the projector 1 are becoming shorter at high speed because maintenance of the filter is not yet implemented may be displayed using a number, an indicator, or the like. In addition, a notification may be made by displaying that unrecoverable losses are being accumulated in internal devices of the projector 1.

Presentation of guidance information may be performed when the power of the projector 1 is turned off for the first time since it is determined to present guidance information, immediately after presentation of guidance information is determined, or the like. In addition, in the case of displaying guidance information on an image projected on the projection plane of the projector 1, the display position of the guidance information may be at four corners that do not interfere with a projected image, such as at the lower right of the image shown in FIG. 7, for example, or the guidance information may be displayed on the whole image so as to motivate the user strongly.

Thereafter, the determination unit 120 determines whether or not maintenance has been implemented for the device for which implementation of maintenance has been prompted (S130). Whether or not maintenance has been implemented can be determined on the basis of sensor information acquired by the sensor 50 after the guidance information is notified. For example, whether or not maintenance of the filter 40 has been implemented can be determined depending on whether or not the internal temperature has dropped to a predetermined temperature or below using the internal temperature of the projector 1 acquired as sensor information, for example. The rise in internal temperature caused as a result of degradation in function of the filter 40 is eliminated when the filter 40 is cleaned, and the internal temperature drops. In this manner, it is possible to determine whether or not maintenance has been implemented utilizing sensor information itself. Alternatively, the functional state of each device may be analyzed by the analysis unit 110 using sensor information, and whether or not maintenance has been implemented may be determined on the basis of the functional state.

Figure 10:
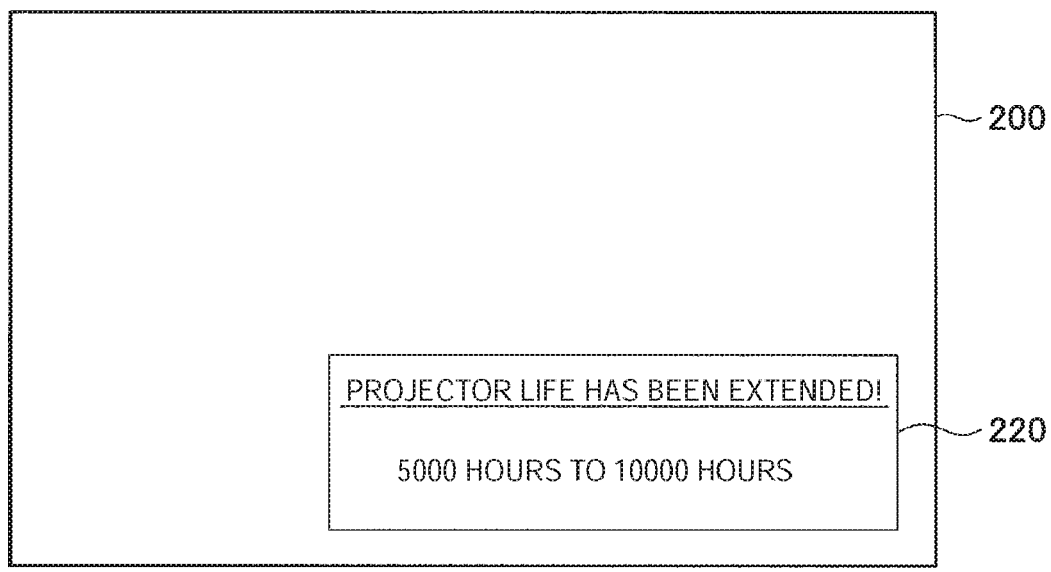
FIG. 10 is an explanatory diagram showing an example of guidance information on the screen projected on the projection plane, and showing an example of presenting an effect produced by maintenance.

When it is determined that maintenance of a device targeted for maintenance has been implemented, the determination unit 120 presents an effect to be produced by implementing maintenance to the user (S140), and after termination of the processing, the information processing device 100 waits for a timing when the maintenance implementation notification processing is implemented next time. As shown in FIG. 10, for example, effect information 220 notifying that the projector life has been extended from the projector life before maintenance as a result of implementing maintenance of the filter may be presented. Further, the extension of the life of an internal device included in the projector 1 may be presented. In addition, since the information processing device 100 is also capable of calculating a timing of implementing next maintenance if it is assumed that the usage environment is identical, an estimate of the time when next maintenance is to be implemented may be presented to the user.

On the other hand, when it is determined in step S130 that maintenance of the device targeted for maintenance has not been implemented, the determination unit 120 determines to continue presenting guidance information to the user. Then, the determination unit 120 determines whether or not damage to devices provided within the projector 1 occurs to determine whether or not the driving mode of the projector 1 needs to be changed (S150) When the projector 1 is used continuously without implementation of maintenance of the device targeted for maintenance, loads are imposed not only on the device but also on other devices, and performance and lives of these devices are likely to be reduced.

Therefore, when non-implementation of maintenance is continued, and it is determined that the life of at least any one of devices included in the projector 1 becomes shorter than a predetermined time, a change is made to a driving mode of reducing part of functions of the projector 1 to reduce loads (S160). In the case where it is determined that the driving mode needs to be changed, the determination unit 120 outputs a driving mode change instruction to the driving control unit 70 that controls driving of each device of the projector 1. Upon receiving the driving mode change instruction, the driving control unit 70 reduces performance of a device that needs to be protected from an external load to protect the device.

For example, when maintenance of the filter 40 is necessary, but maintenance is not implemented, the driving control unit 70 makes a change to a driving mode of increasing the number of rotation of the cooling fan 30 or reducing the output of a light source part in order to suppress a rise in internal temperature of the projector 1. Accordingly, it is possible to prevent essential functions of the projector 1 from being reduced as a result that maintenance is not implemented, so that the projector 1 can be protected.

After the driving mode is changed in step S160, or when it is determined in step S150 that a change of the driving mode is not yet necessary, the process returns to processing in step S130, and it is determined whether or not maintenance has been implemented. Then, until maintenance is implemented, processing in steps S130 to S160 is repeatedly executed. Note that, in the case where maintenance of the device is executed after the driving mode is changed in step S160, the driving mode of the projector 1 may be returned to a usual driving mode.

The maintenance implementation notification processing performed by the information processing device 100 in the projector 1 according to the present embodiment has been described above. The projector 1 according to the present embodiment can notify maintenance implementation at an appropriate timing on the basis of the functional state of a device provided within the projector 1. Accordingly, it is possible to eliminate unnecessary maintenance, and it is also possible to prevent the projector 1 from being used continuously in the state where maintenance is necessary. For example, the device damage speed varies between the case where the usage environment of the projector 1 is clean and the case where there is heavy dust. Also in such cases, it is possible to prompt for implementation of maintenance at the optimum timing.

In addition, the projector 1 according to the present embodiment is capable of presenting the life of the projector or information such as an actual image together when notifying the user of guidance information that prompts for implementation of device maintenance. Accordingly, it is possible to motivate the user to implement maintenance more strongly, which can lead to a long-term stable operation of equipment. In addition, when the user implements maintenance of a device targeted for maintenance, it is also possible to present an effect to be produced accordingly. Accordingly, it is possible to give the user clear motivation to perform maintenance, and to arouse an attachment to the equipment.

Note that, in the above description, the functional state of a device is displayed in guidance information merely in the case where it has been determined that maintenance of the device needs to be implemented, whilst the present disclosure is not limited to such an example, but the functional state of the device may be presented to the user in accordance with a user instruction, for example. For example, there are also cases where the user wishes to check the effect of maintenance of a device such as a filter or the like, and where the user wishes to check the functional state of the current filter. Therefore, a function of displaying the functional state of a device may be provided on a user-accessible menu screen for operating the projector 1, for example, so that presentation can be made in accordance with a user request.

Further, it is also possible to change the projector 1 according to the present embodiment to a driving mode of imposing less loads on internal devices of the projector 1 in the case where the user does not implement maintenance of a device targeted for maintenance. Accordingly, it is possible to prevent each of the devices included in the projector 1 from continuously suffering irreversible damage to protect equipment.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the above-described embodiment merely addresses maintenance of the filter for ease of description, whilst the present technology is not limited to such an example. For example, it is also possible to determine whether or not maintenance of a plurality of devices is necessary in parallel.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An image projection device including:
an analysis unit configured to compute a functional state of one or more devices included in the image projection device on the basis of sensor information acquired from one or more sensors;
a determination unit configured to determine whether or not maintenance of the devices is necessary on the basis of the functional state of the devices; and
a notification control unit configured to present guidance information that prompts for implementation of maintenance of the devices to a user through a notification unit at a timing when it is determined by the determination unit that maintenance is necessary.

(2)
The image projection device according to (1), in which
the notification control unit causes the functional state of the devices for which it has been determined that maintenance is necessary to be further presented.

(3)
The image projection device according to (1) or (2), in which
the notification control unit causes an effect to be produced by implementing maintenance of the devices for which it has been determined that maintenance is necessary to be further presented.

(4)
The image projection device according to (3), in which
the analysis unit analyzes a functional state before implementing maintenance of the devices for which it has been determined that maintenance is necessary and a functional state predicted after implementing maintenance, and
the notification control unit causes the functional states of the devices before and after implementing maintenance to be notified.

(5)
The image projection device according to any one of (1) to (4), in which
the notification control unit causes an image obtained by imaging the devices for which it has been determined that maintenance is necessary to be further presented.

(6)
The image projection device according to any one of (1) to (5), in which
the analysis unit computes at least either a life or a failure rate of the devices as the functional state of the devices.

(7)
The image projection device according to any one of (1) to (6), in which
the one or more sensors include at least any one of a temperature sensor, a luminance sensor, a chromaticity sensor, a flow meter, an hour meter, or an imaging device provided within the image projection device.

(8)
The image projection device according to any one of (1) to (7), in which
the analysis unit computes the functional state of the devices on the basis of the sensor information acquired after the guidance information is notified, and
the determination unit determines whether or not maintenance has been implemented on the basis of the functional state of the devices after the guidance information is notified, and when it is determined that maintenance has not been implemented, determines that the image projection device is driven in a driving mode of reducing an actuation load.

(9)

The image projection device according to any one of (1) to (8), in which the analysis unit computes the functional state of the devices on the basis of the sensor information acquired after the guidance information is notified, the determination unit determines whether or not maintenance has been implemented on the basis of the functional state of the devices after the guidance information is notified, and when it is determined that maintenance has been implemented, computes the functional state of the devices after implementing maintenance, and the notification control unit causes the functional state of the devices after implementing maintenance to be notified.

(10)

The image projection device according to any one of (1) to (9), in which the notification control unit causes the functional state of the devices included in the image projection device to be notified in accordance with a user instruction.

(11)

The image projection device according to any one of (1) to (10), in which the notification control unit causes at least the guidance information to be displayed on an image projected by the image projection device.

(12)

An information processing method including:

computing, using a processor, a functional state of one or more devices included in an image projection device on the basis of sensor information acquired from one or more sensors;

determining, using the processor, whether or not maintenance of the devices is necessary on the basis of the functional state of the devices; and presenting, using the processor, guidance information that prompts for implementation of maintenance of the devices to the user through a notification unit at a timing when it is determined that maintenance is necessary.

REFERENCE SIGNS LIST 1 projector
10 enclosure
12 air inlet
14 exhaust port
20 component
30 cooling fan
40 filter
50 sensor
51 temperature sensor
52 luminance sensor
53 chromaticity sensor
54 flow meter
55 hour meter
56 camera
60 notification unit
61 display processing unit
63 projection unit
65 main body display unit
67 voice output unit
69 interface unit
70 driving control unit
100 information processing device
110 analysis unit
120 determination unit
130 notification control unit
140 storage unit
200 image
210, 212, 214 guidance information
214a captured image
220 effect information

The invention claimed is:

1. An image projection device, comprising:
processing circuitry configured to
compute a functional state of one or more devices included in the image projection device based on sensor information acquired from one or more sensors,
determine whether or not maintenance of any of the devices is necessary based on the computed functional state of the devices, and
present, to a user, guidance information that prompts for implementation of maintenance of the devices, when the processing circuitry determines that maintenance is necessary,
wherein the processing circuitry is further configured to
determine the functional state before implementing maintenance of those devices for which the processing circuitry determines that maintenance is necessary, and determine a predicted functional state that would result if the maintenance is implemented, and
present, to the user, the determined functional state before implementing maintenance, and the determined predicted functional state that would result if the maintenance is implemented,
wherein the processing circuitry is further configured to display a first predicted lifetime if the maintenance is not performed, together with a second predicted lifetime if the maintenance is performed.

2. The image projection device according to claim 1, wherein the processing circuitry is further configured to present the functional state of those devices for which the processing circuitry determines that maintenance is necessary.

3. The image projection device according to claim 1, wherein the processing circuitry is further configured to present an effect to be produced by implementing maintenance of those devices for which the processing circuitry determines that maintenance is necessary.

4. The image projection device according to claim 1, wherein the processing circuitry is further configured to cause an image obtained by imaging those devices for which the processing circuitry determines that maintenance is necessary to be presented.

5. The image projection device according to claim 1, wherein the processing circuitry is further configured to compute at least a life or a failure rate of the devices as the functional state of the devices.

6. The image projection device according to claim 1, wherein the one or more sensors include at least one of a temperature sensor, a luminance sensor, a chromaticity sensor, a flow meter, an hour meter, and an imaging device provided within the image projection device.

7. The image projection device according to claim 1, wherein the processing circuitry is further configured to
compute the functional state of the devices based on the sensor information acquired, after the guidance information is notified, and
determine whether or not maintenance has been implemented based on the functional state of the devices after the guidance information is notified, and when the processing circuitry determines that maintenance has not been implemented, determine that the image projection device is driven in a driving mode of reducing an actuation load.

8. The image projection device according to claim 1, wherein the processing circuitry is further configured to
compute the functional state of the devices based on the sensor information acquired after the guidance information is notified,
determine whether or not maintenance has been implemented based on the functional state of the devices after the guidance information is notified, and when the processing circuitry determines that maintenance has been implemented, compute the functional state of the devices after implementing maintenance, and
cause the functional state of the devices after implementing maintenance to be notified.

9. The image projection device according to claim 1, wherein the processing circuitry is further configured to cause the functional state of the devices included in the image projection device to be notified in accordance with a user instruction.

10. The image projection device according to claim 1, wherein the processing circuitry is further configured to cause at least the guidance information to be displayed on an image projected by the image projection device.

11. An information processing method, comprising:
computing, by processing circuitry, a functional state of one or more devices included in an image projection device based on sensor information acquired from one or more sensors;
determining, by the processing circuitry, whether or not maintenance of any of the devices is necessary based on the functional state of the devices; and
presenting, by the processing circuitry, guidance information that prompts for implementation of maintenance of the devices to a user when the processing circuitry determines that maintenance is necessary, wherein the method further includes
determining the functional state before implementing maintenance of those devices for which the processing circuitry determines that maintenance is necessary, and determining a predicted functional state that would result if the maintenance is implemented,
presenting, to the user, the determined functional state before implementing maintenance, and the determined predicted functional state that would result if the maintenance is implemented, and
displaying a first predicted lifetime if the maintenance is not performed, together with a second predicted lifetime if the maintenance is performed.

* * * * *